(12) United States Patent
Bönsel

(10) Patent No.: US 6,852,440 B1
(45) Date of Patent: Feb. 8, 2005

(54) FUEL CELL WITH IMPROVED LONG TERM PERFORMANCE, METHOD FOR OPERATING A PME FUEL CELL AND PME FUEL CELL BATTERY

(75) Inventor: Harald Bönsel, Niedernhausen (DE)

(73) Assignee: Axiva GmbH (DE)

( * ) Notice: Subject to any disclaimer, the term of this patent is extended or adjusted under 35 U.S.C. 154(b) by 0 days.

(21) Appl. No.: 09/762,513

(22) PCT Filed: Jul. 1, 1999

(86) PCT No.: PCT/EP99/04570

§ 371 (c)(1),
(2), (4) Date: Jul. 24, 2001

(87) PCT Pub. No.: WO00/10215

PCT Pub. Date: Feb. 24, 2000

(30) Foreign Application Priority Data

Aug. 10, 1998 (DE) .......................................... 198 36 142
Aug. 26, 1998 (DE) ...................................... 298 15 330 U

(51) Int. Cl.[7] .......................... H01M 2/08; H01M 8/00; H01M 6/42
(52) U.S. Cl. ............................. 429/37; 429/35; 429/36; 429/12; 429/149
(58) Field of Search .............................. 429/36, 32, 35, 429/38, 37, 21, 53, 17, 14, 22, 31, 26, 33, 13; 48/76; 604/890.1; 204/242, 252, 263, 283

(56) References Cited

U.S. PATENT DOCUMENTS 5,858,569 A * 1/1999 Meacher et al. ............... 429/26
5,912,088 A 6/1999 Ernst

FOREIGN PATENT DOCUMENTS

| EP | 0 499 593 A1 | 8/1992 |
| EP | 0 589 850 A1 | 3/1994 |
| EP | 0 869 568 A1 | 10/1998 |
| EP | 0 918 362 A2 | 5/1999 |
| JP | 04/012465 | 1/1992 |
| JP | 05/101837 | 4/1993 |
| JP | 06/236765 | 8/1994 |
| JP | 09/199145 | 7/1997 |
| JP | 10/172587 | 6/1998 |
| WO | WO 96/24958 | 8/1996 |
| WO | WO 98/33225 | 7/1998 |

* cited by examiner

Primary Examiner—Bruce F. Bell
Assistant Examiner—Robert Hodge
(74) Attorney, Agent, or Firm—Connolly Bove Lodge & Hutz LLP

(57) ABSTRACT

The invention relates to a PEM fuel cell which has a new type of edge structure, in which a reservoir of water is formed in a minute gap between membrane and edge seal, which considerably improves the utilization time of a polymer electrolyte membrane, in particular with dry process gases.

3 Claims, 1 Drawing Sheet

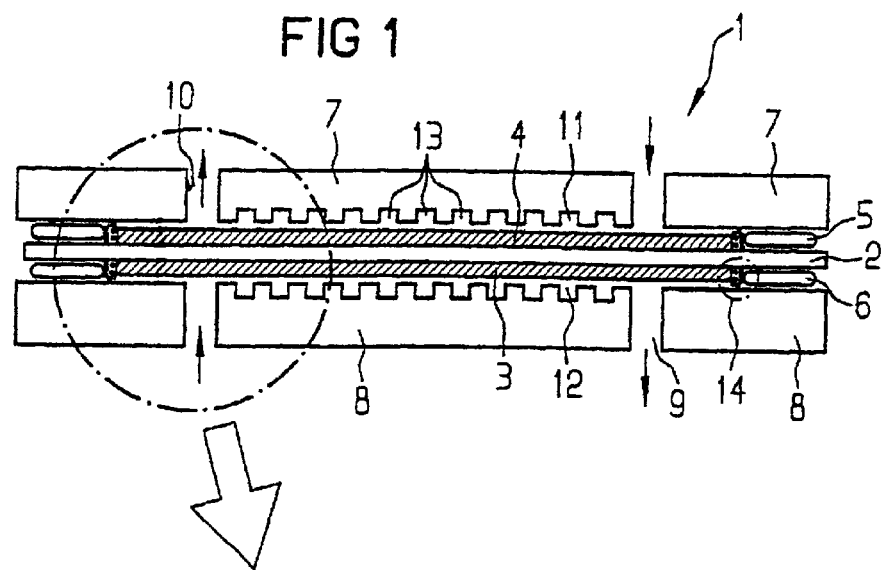
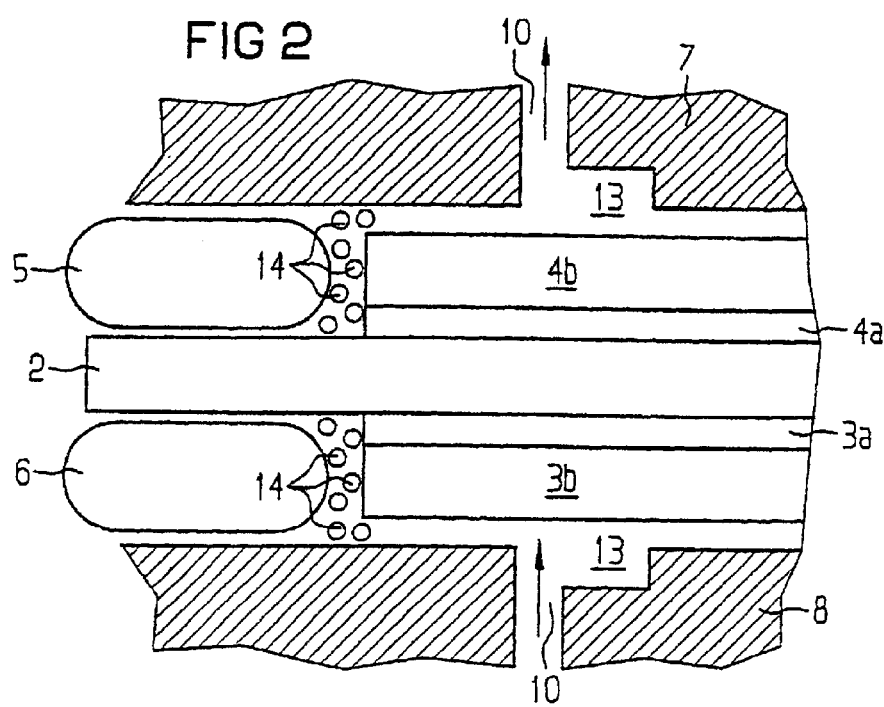

FUEL CELL WITH IMPROVED LONG TERM PERFORMANCE, METHOD FOR OPERATING A PME FUEL CELL AND PME FUEL CELL BATTERY

The invention relates to a polymer electrolyte membrane (PEM) fuel cell with a new type of design of the edge region, and to a method for operating a fuel cell and to a fuel, cell storage battery.

A design of an edge region of a PEM fuel cell in which the edge seal is made by a frame element which presses the respectively adjacent collector plate onto the top and bottom of the membrane in such a way that the three parts are connected to one another in a mechanically secure, gastight and electronically insulating manner, is known from DE-C 44 42 285 (see FIG. 2 therein). The two electrodes with which the membrane is coated on each side do not extend as far as into this edge region. Therefore, there is a minute gap formed at the boundary between the electrode coating of the membrane and the edge seal, at which gap the membrane is directly exposed to the process gases, i.e. without a protective electrode layer. This causes the membrane to dry out and become brittle here. Also, previous damage which may be caused, for example, during the hot pressing of the membrane-electrodes unit may lead to gas breakthroughs at this location where the membrane is directly exposed to the process gases. The utilization time or long-term performance of a membrane is correspondingly limited by this gap at which the membrane is directly exposed to the process gases.

It is an object of the present invention to provide a PEM fuel cell structure with improved long-term performance.

This object is achieved by a PEM fuel cell as claimed in claim 1, by the method for its production as claimed in claim 3 and by the provision of the fuel cell storage battery as claimed in claim 4. Further configurations of the invention are given in the description, the figures and the explanations thereof.

The invention relates to a PEM fuel cell which comprises at least two terminal plates which clamp in a membrane which is covered on both sides, apart from the outermost edge, by an electrode layer, the covering of the membrane with at least one electrode layer projecting into the structural edge region of the fuel cell. This enlargement of at least one electrode layer not only means that the membrane, at least on one side, is no longer directly exposed to the process gas, but also even leads to a small reservoir of water being formed at the boundary between electrode-coated and uncoated membrane in the edge region, which water reservoir continuously wets the membrane.

The invention also relates to a method for operating a PEM fuel cell, in which the formation of product water in the structural edge region of the fuel cell is utilized to wet the membrane.

Finally, the invention relates to a PEM fuel cell storage battery, comprising at least two PEM fuel cells.

In this context, the term terminal plate is understood as meaning any type of separators and cooling and contact plate which enclose the gas space of a fuel cell on the side which lies opposite the membrane.

The "structural edge region" of the fuel cell is understood as meaning that region of the cell which lies outside the active cell areas and in which, therefore, there is no regular supply and removal of process gases and reaction products.

The electrode layer is a gas-permeable layer and preferably comprises an active catalyst layer and a support, such as for example a carbon paper.

The membrane is preferably a proton-conducting electrolyte film which in the operating state has a water content of approx. 20–40% by weight.

In the edge region, seals are preferably arranged between the terminal plates and the membrane.

According to one configuration of the invention, the frame element is made from metal and an electrically insulating layer is additionally present in the edge region, allowing series connection when the individual cells are stacked without there being any risk of a short circuit.

One configuration of the invention is explained below with reference to two figures, in which:

FIG. 1 shows the structure of a fuel cell in cross section, and

FIG. 2 shows a detailed enlargement of the edge region.

FIG. 1 shows a fuel cell 1. The membrane 2, which extends over the entire length of the cell, is in the center. The membrane is coated on both sides with the electrodes 3 and 4, as far as the edge. The seals 5 and 6, which adjoin the two sides of the membrane where the electrodes stop, can be seen at the edge. The terminal plates 7 and 8, which delimit the two reaction spaces 11 and 12 of the fuel cell 1 on the opposite side from the membrane 2, can be seen at the top and bottom.

The cross section through the fuel cell 1 selected in FIG. 1 is taken through the supply or removal ducts 9/10 for the process gases. Therefore, in each case two removal or supply openings, through which the process gases flow, for example in the direction indicated by the arrows, can be seen in the terminal plates 7 and 8. The cell area between the supply and removal ducts is the active cell area. The edge region of the fuel cell lies on the other side of the ducts.

In operation, a process gas, for example the fuel, flows through the distribution ducts 13 into one of the two reaction spaces 11/12, for example the anode chamber 11, along the active cell area where the reaction of oxidant and fuel to form water and current takes place. The product water is regularly removed along the active cell area. Hitherto, the active cell area has been the only point in a fuel cell at which product water is formed. According to the invention, reaction now also takes place, to a slight extent, in the structural edge region of the cell, where the electrode layers have according to the invention been extended along the membrane. The process gases reach this area practically only by diffusion through the support of the active catalyst layer, i.e. for example through the carbon paper, since the terminal plates in the structural edge region do not have any distribution ducts 13.

As has been stated, the process gas flows in the structural edge region are small or even nonexistent and therefore the product water formed there cannot be removed. Consequently, product water 14 collects in the gap which forms and adjoins the end of the electrode layer on the membrane. As a result, a small reservoir of water 14 is formed between the seals 5 and 6 and the membrane 2. This reservoir of water offers the following advantages:

1.) The membrane surface which lies outside the active electrode surface is always surrounded by water. Membranes whose mechanical resistance is highly dependent on the water content can therefore be used with long-term stability.

2.) Any damage which may be present in the edge region of the membrane, caused, for example, by hot pressing, could hitherto, i.e. without the reservoir of water, have led to gas breakthroughs. On account of the water cushion which is now present, only gases which are dissolved in water can diffuse to the membrane. This quantity of gas is so small that there is no possibility of local overheating and further damage to the membrane, such as for example a gas breakthrough.

3.) The membrane is prevented from becoming brittle and drying out in the edge region.

The region which is circled in FIG. 1 is shown in detail in FIG. 2. The membrane 2, which is surrounded by the seals 5 and 6 at the edge, is arranged in the center. Toward the center of the cell area, it is coated with the electrodes 3 and 4, which comprise the catalyst layers 3a and 4a and the supports 3b and 4b. The axial supply duct 10, the terminal plates 7 and 8 with their distribution ducts 13 in the reaction spaces 11 and 12 can also be seen. A reservoir of water 14 is formed at the end of each of the electrode coatings of the membrane, since the product water which is formed there cannot be removed.

The novel extension of the electrode layer into the structural edge region of the fuel cell means that a reservoir of water, which wets the membrane, is formed in that region in a gap at a location on the membrane.

What is claimed is:

1. A PEM fuel cell which comprises at least two terminal plates which clamp a membrane which, apart from the outermost edge, is covered on both sides by an electrode layer, the covering of the membrane with at least one electrode layer projecting into the structural edge region of the fuel cell, product water in the structural edge region of the fuel cell for wetting the membrane, and seals on opposite sides of the membrane in the edge region arranged between the membrane and the terminal plates, wherein the seals stop with the membrane and the product water is between the seal and the membrane.

2. A fuel cell storage battery which is made from fuel cells which are electrically series-connected and comprises a stack of at least two fuel cells as claimed in claim 1 which are mechanically connected to one another.

3. A PEM fuel cell which comprises at least two terminal plates which clamp a membrane which, apart from the outermost edge, is covered on both sides by an electrode layer, the covering of the membrane with at least one electrode layer projecting into the structural edge region of the fuel cell, product water in the structural edge region of the fuel cell for wetting the membrane, and seals on opposite sides of the membrane in the edge region arranged between the membrane and the terminal plates, and including a reservoir on each side of the membrane between each seal and the membrane, and wherein the product water is within both reservoirs.

* * * * *

UNITED STATES PATENT AND TRADEMARK OFFICE
CERTIFICATE OF CORRECTION

PATENT NO.   : 6,852,440 B1
DATED        : February 8, 2005
INVENTOR(S)  : Harald Bonsel et al.

It is certified that error appears in the above-identified patent and that said Letters Patent is hereby corrected as shown below:

<u>Title page,</u>
Item [75] Inventor, please add -- Gregor Deckers, Frankfurt Am Rhein (DE). --
Item [30] Foreign Application Priority Data, "198 36 142" should read
-- 198 36 142.4 --
"298 15 330 U" should read -- 298 15 330.0 --

Signed and Sealed this

Twenty-fourth Day of May, 2005

JON W. DUDAS
*Director of the United States Patent and Trademark Office*